Inventor:
Oscar Steiner,
by Emery, Booth, Townsend, Miller & Weidner
Attys.

Jan. 6, 1942.    O. STEINER    2,269,401
LENS MOUNT FOR PHOTOGRAPHIC CAMERAS
Original Filed Jan. 12, 1940    3 Sheets-Sheet 2
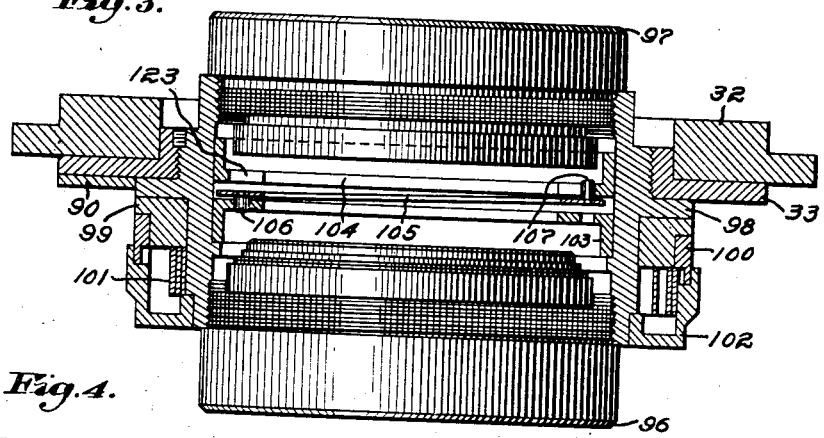
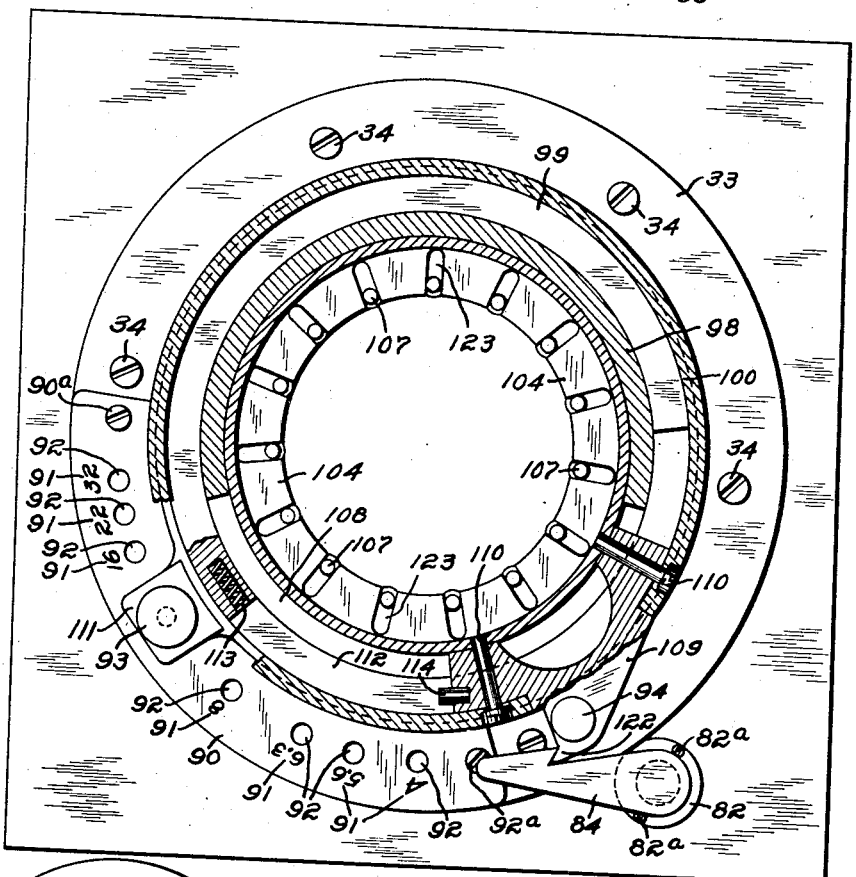
Inventor:
Oscar Steiner,
by Emery, Booth, Townsend, Miller & Weidner
Attys.

Jan. 6, 1942.　　　　　　O. STEINER　　　　　　2,269,401
LENS MOUNT FOR PHOTOGRAPHIC CAMERAS
Original Filed Jan. 12, 1940　　3 Sheets-Sheet 3
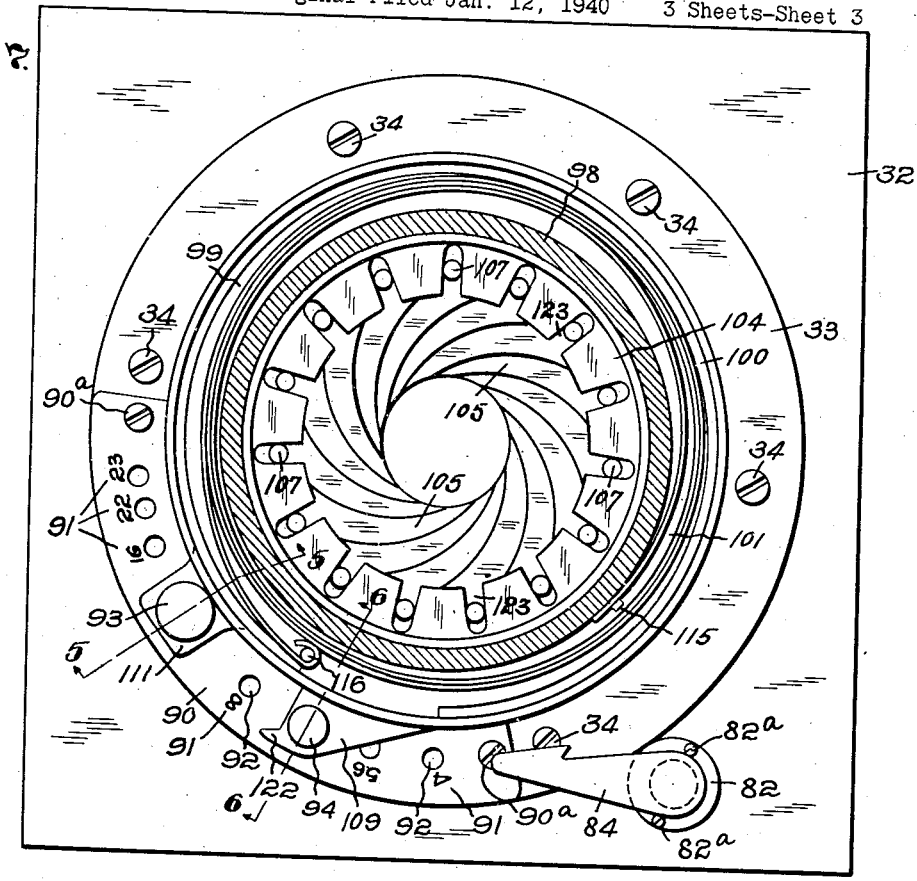
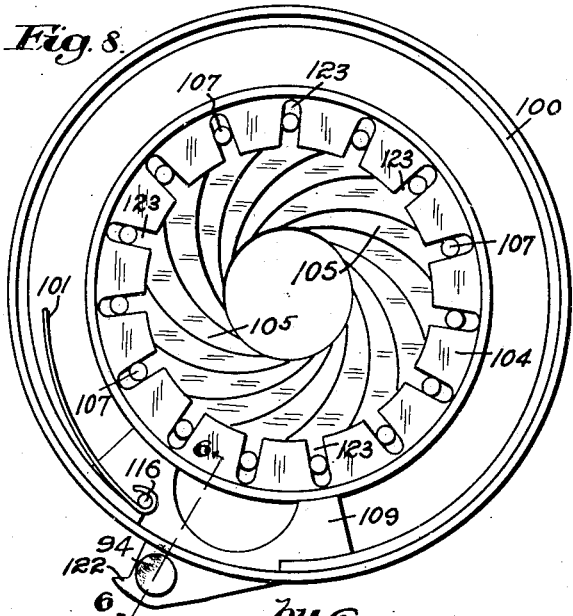
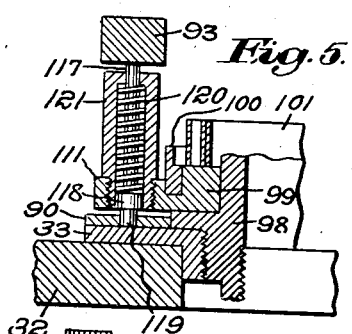
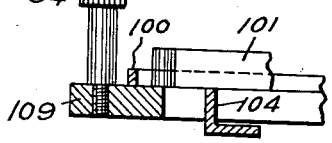
Inventor:
Oscar Steiner, Patented Jan. 6, 1942

2,269,401

UNITED STATES PATENT OFFICE 2,269,401

LENS MOUNT FOR PHOTOGRAPHIC CAMERAS

Oscar Steiner, Irondequoit, N. Y., assignor to The Folmer Graflex Corporation, Rochester, N. Y., a corporation of Delaware Original application January 12, 1940, Serial No. 313,534, now Patent No. 2,236,925, dated April 1, 1941. Divided and this application February 4, 1941, Serial No. 377,317

5 Claims. (Cl. 95—64)

This application is a division of my co-pending application Ser. No. 313,534, filed January 12, 1940, now Patent No. 2,236,925, April 1, 1941.

This invention relates to lens mounts for photographic cameras.

In order that the principle of the invention may be readily understood, I have disclosed a single embodiment thereof in the accompanying drawings, wherein—

Fig. 3 is a vertical section through the lens mount, showing the relation of the illustrated parts;

Fig. 4 is a vertical section through the lens mount, showing the automatic diaphragm resilient bumper and means connecting the diaphragm ring latch dog;

Fig. 5 is a sectional detail on the line 5—5 of Fig. 7;

Fig. 6 is a sectional detail on the line 6—6 of Figs. 7 and 8;

Fig. 7 is a view similar to Fig. 1 excepting that certain parts appear in section, so as more clearly to show the construction of the diaphragm operating means;

Fig. 8 is a view similar to Fig. 7, but on a smaller scale, and showing the connection between the automatic diaphragm adjusting ring and the automatic diaphragm operating pawl;

Fig. 9 is a side elevation of one of the diaphragm leaves to show more clearly the position of the diaphragm leaf operating pins; and Fig. 10 is a top plan view of Fig. 9.

It is well known to the users of single-lens reflex cameras that it would be a decided advantage to focus with the diaphragm wide open, thereby having available a greater quantity of light on the ground glass than would be had if the diaphragm were stopped down to that aperture at which the picture was to be made. Assuming, for example, that the operator is desirous of making an exposure at $f:11$, as a rule, insufficient light would reach the ground glass focusing screen to focus the camera accurately. However, if the diaphragm were open, say to $f:4.5$, adequate light would be had. But in making these changes manually, the operator often forgets or does not have the time to adjust the diaphragm to its proper setting after focusing. I herein disclose automatic means for doing this, providing means whereby the diaphragm of the lens is set at the full open position and a preselected stop is chosen and adjustment made accordingly. At the instant of making the exposure, the diaphragm operating mechanism is released automatically, closing down the diaphragm to that pre-selected opening without any thought on the part of the operator.

There have been several attempts to provide means for accomplishing this result. The mechanism disclosed in the patent to Torkel Korling No. 2,029,238, dated January 28, 1936, is so far as I am aware the nearest approach in the prior art to a satisfactory solution of this problem.

To have a satisfactorily operating automatic diaphragm stop, it is necessary that it work not only on one particular lens but on any lens that may be chosen to be used with the camera, and it is very desirable that no adjustment be made on any of the operating mechanism other than the changing of the lens in the usual manner. In the present disclosure this is taken care of, and any lens, if provided with automatic diaphragm adjusting means, is, in the practice of my invention, instantly coupled with the operating mechanism when that lens is inserted in the camera.

Preferably lenses and lens boards can readily be changed without in any way making adjustments of or in the diaphragm control means. The disclosure in the said Korling patent is confined to the use of one lens only, whereas in accordance with the present disclosure any number of lenses can be used interchangeably, provided the lens mounts are equipped with the automatic feature, and they can all be controlled from the mirror-release mechanism.

I will now describe the lens barrel with the automatic diaphragm built thereinto and for that purpose I will refer first and more particularly to Figs. 1 to 6 inclusive.

Figure 1:
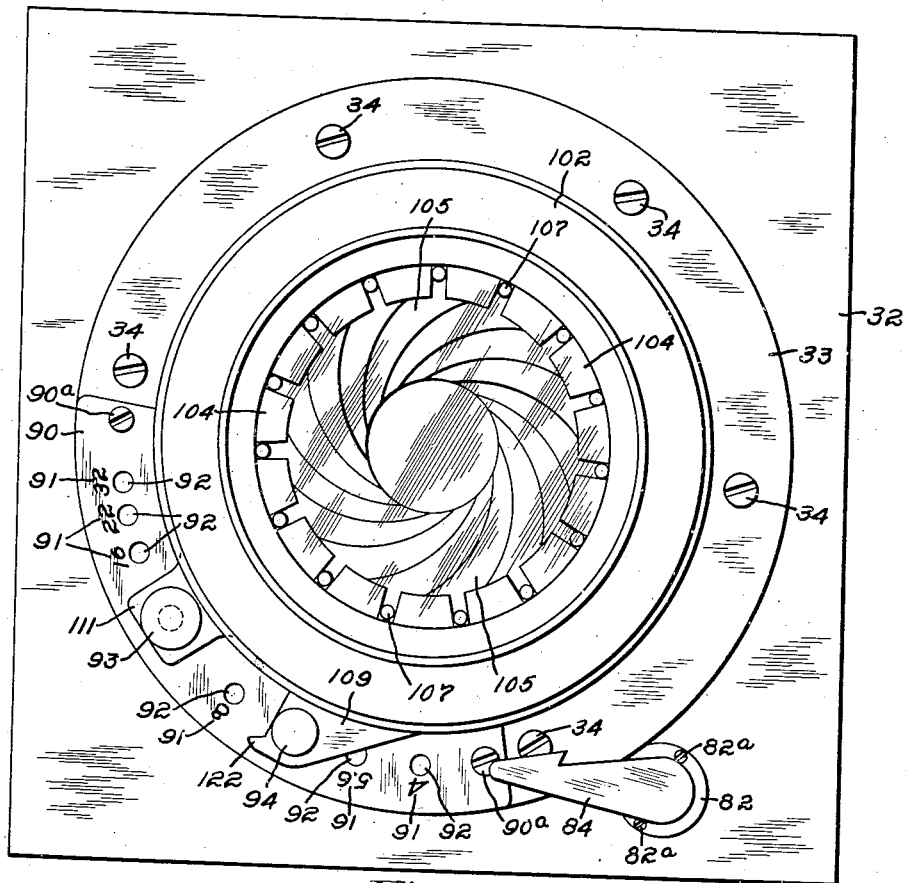
Fig. 1 is a front elevation of the lens board of a photographic camera, on which is mounted a lens having the automatic diaphragm mechanism.
Figure 2:
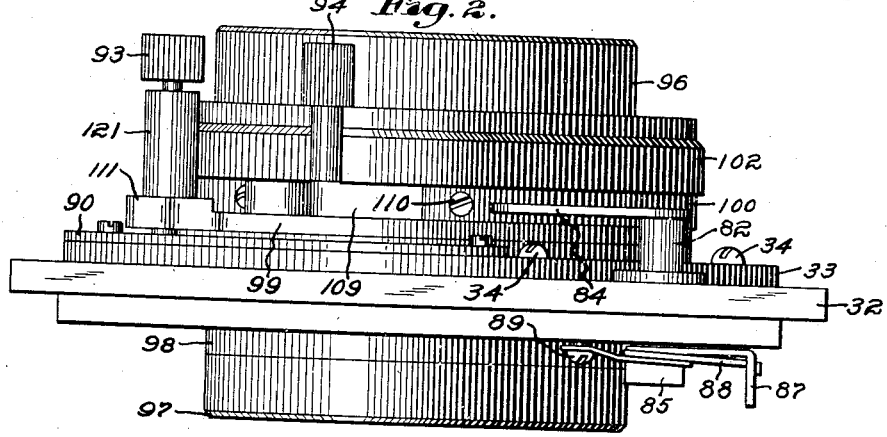
Fig. 2 is a side elevation of Fig. 1.

In Fig. 1 there is shown a diaphragm scale 90 which is held to the flange 33 of the lens board 32 by screws 90a, 90a. The said scale is provided with markings indicated generally at 91 and with index holes indicated generally at 92 as placed in alignment with the markings 91. A diaphragm stop adjusting handle is represented at 93, a diaphragm ring-setting knob at 94 and a diaphragm-retaining dog at 122. The mounting of the lens cells 96 and 97 upon the lens barrel 98 is shown in Fig. 2.

In Fig. 3, the lens barrel structure, indicated generally at 98, is shown in transverse section, and in Fig. 4 the diaphragm stop-setting or adjusting ring is indicated at 99, the diaphragm ring at 100, the diaphragm return-spring at 101, and the diaphragm return-spring cover at 102. The lens barrel 98 is provided with a stationary diaphragm ring 103, shown in Fig. 3, a diaphragm actuating ring 104 and diaphragm leaves 105, each of which is provided with a pin 106 and a pin 107, best shown in Figs. 9 and 10.

The stationary diaphragm ring 103 is fastened to the lens barrel 98 in any suitable or usual manner, as by means of pins. The diaphragm actuating ring 104 is free to turn sufficiently far to cause the diaphragm aperture to be closed or stopped down to the smallest aperture. As shown in Fig. 4, the lens barrel 98 is provided with a slot 108, and riding in the said slot 108 is a diaphragm dog-plate or member 109 attached to the diaphragm actuating ring 104 and the diaphragm ring 100 by means of screws 110, 110. The diaphragm stop-setting and adjusting ring 99 has a radially extending member 111 to which the adjusting handle or knob 93 is attached. The diaphragm stop-setting or adjusting ring 99 is provided with a notched-out portion or slot 112 to afford clearance for the diaphragm dog-plate 109. One end of the diaphragm stop-setting or adjusting ring 99 is provided with a coiled spring 113 engaging a pin 114 of the diaphragm dog-plate 109. The purpose thereof is to absorb the jar when the diaphragm-actuating ring 104 and the diaphragm ring 100 are stopped against the end of the notched-out portion or slot 112 of the diaphragm stop-setting or adjusting ring 99.

The diaphragm return-spring cover 102 is provided with an opening in which the spring 101 is positioned as shown in Figs. 3, 5 and 6. One end of the said spring 101 is attached to the lens barrel 98 by means of a screw 115, shown in Fig. 7, and the opposite end of said spring 101 is attached to the diaphragm dog-plate or member 109 by means of a pin 116, also shown in Fig. 7, being wrapped about the lens barrel 98 a number of times, three turns being indicated in Fig. 5. The said spring 101 has sufficient tension to return the diaphragm dog-plate or member 109 to a position wherein one edge of said plate or member 109 will contact with the end of the notch or slot 112 of the diaphragm stop-setting or adjusting ring 99. Said diaphragm stop-setting or adjusting ring 99 is adjustable between the hole 92 opposite the diaphragm member f:32, and the hole 92 opposite the diaphragm f:4 as limits. It will therefore be seen that the position of the end of the notch or slot 112 will be varied between these two extremes.

The structure of parts just set forth makes possible the use of a flat type coiled spring, such as 101, which is of the type known as a "clock spring," being rectangular in cross section and of substantial width. Such spring has a nearly uniform tension within the operating limits, as is highly desirable in this invention. The said type of spring, because of its uniform torque or tension, provides a smoother operating diaphragm, operating under very much lower spring tension, thus preventing the usual jar that would occur if the regular type of helical spring were used. When such usual helical spring is employed to operate the diaphragm, the initial tension required is so great that the inertia set up in the moving parts is sufficient to cause rapid destruction of the operating parts of the diaphragm, particularly the diaphragm pins 107. The particular advantages of such structure will be apparent when examining or considering a diaphragm leaf of a conventional lens mount. These leaves are usually made up of very thin steel, never over .003. On either end of each of these leaves is provided a pin 107 (Figs. 9 and 10), which pins necessarily have to be riveted to such leaves. Since these leaves are of such thin material, it is impossible to get a satisfactory structure as far as strength is concerned. For a helical type of spring, such as heretofore used in diaphragm operating mechanism, to have sufficient power over the full range of movement, it had to be tensioned or stretched to a point where its tension was very high at the moment of releasing the diaphragm. This set the diaphragm ring into very rapid motion, which motion had, of course, to be arrested quickly, and the inertia set up by the movement of these parts had to be absorbed somehow. The result was that in such usual constructions the rapid stopping and starting of the diaphragm leaves quickly loosened up the pins, such as 107, from the diaphragm leaves, thus making the diaphragm inoperative and useless. In addition to the advantages secured by the use of the spring 101, the coiled spring 113 and the pin 114 provide means for absorbing part of the inertia set up in the movement of the diaphragm ring, said coiled spring 113 being caused to be compressed by pin 114 at the end of the travel of the diaphragm ring clockwise, viewing Fig. 4. Such inertia-absorbing means, if the usual helical spring were used, would not be sufficient to prevent the rapid destruction of the diaphragm leaves, but when used in cooperation with the flat spring 101 they are entirely sufficient for the purpose.

As shown in Fig. 5, the diaphragm stop-adjusting knob or handle 93 is provided with a pin 117 having a shoulder 118 and a dowel end 119 for engaging any of the holes 92 in the plate 90. The pin 117 is caused to be thrust downward under the influence of a spring 120 in the barrel 121, as shown in Fig. 5. The said barrel 121 is threaded into the radially extending member 111 of the diaphragm stop-setting or adjusting ring 99. In Fig. 4, the diaphragm actuating ring 104 is represented as having been moved in a contraclockwise direction until a dog 122 of the dog-plate or member 109 is engaged by the diaphragm-release catch 84 mounted on a shaft in a bearing 82. Inasmuch as said dog-plate or member 109 is attached to the diaphragm actuating ring 104, the said ring will also be turned in a contraclockwise direction sufficiently far to open completely the diaphragm, and the said ring 104 will be held in this position until released in a manner already described. This operation puts tension on the spring 101. Inasmuch as the diaphragm stop-setting or adjusting ring 99 can be adjusted to any position within the limits of f:32 or f:4, or any other diaphragm setting that is or may be provided, the said diaphragm dog-plate or member 109 will be stopped against the end of the notch or slot 112 when the dog 122 is released from the diaphragm-release catch 84.

It will be understood from the just preceding description of parts that I have provided means for sufficiently opening the diaphragm and holding it in open position and then allowing it to be stopped down to any pre-selected condition upon the release of the diaphragm release catch.

The action of the diaphragm leaves 105 is accomplished in a manner already referred to and well known in the art; that is to say, as best shown in Figs. 9 and 10, each leaf 105 is provided with the two pins 106, 107 at opposite ends and faces thereof. The pins 106 engage holes in the stationary diaphragm ring 103 and the pins 107 engage slots 123 in the diaphragm actuating ring 104, as shown in Figs. 1, 3, 4, 7 and 8. As the diaphragm actuating ring 104 is turned either in a clockwise or contraclockwise direction, the diaphragm leaves 105 will be moved. If said diaphragm actuating ring 104 is moved in a contraclockwise direction, the diaphragm leaves 105 will be caused to open up, thus providing a full aperture, and when said diaphragm actuating ring 104 is turned in a clockwise direction, the said diaphragm leaves 105 will be caused to close up more or less, as shown, for example, in Figs. 1, 7 and 8, thus providing any aperture previously selected.

Having thus described one illustrative embodiment of the invention, it is to be understood that although specific terms are employed, they are used in a generic and descriptive sense and not for purposes of limitation, the scope of the invention being set forth in the following claims.

I claim:

1. A lens mount for photographic cameras and like purposes, including, in combination, a lens barrel, a diaphragm ring having diaphragm means, a diaphragm, stop-setting, adjusting ring, and a diaphragm actuating ring free to be turned to stop down the lens aperture, said rings all being concentric with the lens barrel, and a long, thin, metal, diaphragm-return spring 101 having one end thereof connected to said lens barrel and the opposite end thereof connected to said diaphragm actuating ring, said spring being wrapped in a spiral a plurality of turns in the same transverse path about said lens barrel, said spring being of greatly elongated rectangular form in cross section, and thus being of prolonged width compared with its thickness, the said spring, because of its said structure and end connections, imparting a substantially equal force to said diaphragm actuating ring throughout the movement of the latter, thus providing substantially the same amount of tension at the end of its travel as at its start thereof, and permitting a lower over-all spring tension for the operation of the diaphragm ring.

2. A combination according to claim 1 wherein the diaphragm actuating ring has attached thereto a diaphragm dog-plate having a dog adapted to be engaged by a diaphragm return catch, the said diaphragm return spring 101 being attached at one end directly to said diaphragm dog plate.

3. A combination according to claim 1, wherein the diaphragm stop-setting, adjusting ring is provided with a bar-absorbing spring to receive the impact of the diaphragm actuating ring.

4. A combination according to claim 1, in which the diaphragm stop-setting, adjusting ring is a segmental, open ring provided at one end thereof with a jar-absorbing spring, and in which the said diaphragm actuating ring has a segmental diaphragm dog-plate attached thereto, one end of said dog-plate impacting in its movement against said jar-absorbing spring.

5. A combination according to claim 1, in which the diaphragm stop-setting, adjusting ring is a segmental, open ring provided at one end with a jar-absorbing coil spring 113, and in which the said diaphragm actuating ring has a segmental diaphragm dog-plate attached thereto and provided with a projecting pin 114 to engage said coil spring 113.

OSCAR STEINER.